United States Patent
Redford et al.

(12)
(10) Patent No.: US 8,700,032 B2
(45) Date of Patent: *Apr. 15, 2014

(54) SYSTEM FOR TRANSMITTING WIRELESS HIGH-SPEED DATA SIGNALS BETWEEN A TERRESTRIAL-BASED ANTENNA AND AN AIRCRAFT

(75) Inventors: Stephen Redford, Naperville, IL (US); Mark Mielke, Wood Dale, IL (US)

(73) Assignee: Gogo LLC, Itasca, IL (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/222,722

(22) Filed: Aug. 31, 2011

(65) Prior Publication Data

US 2011/0309979 A1    Dec. 22, 2011

Related U.S. Application Data

(63) Continuation of application No. 10/378,203, filed on Mar. 3, 2003, now Pat. No. 8,032,135.

(51) Int. Cl.
*H04W 4/00* (2009.01)
*H04W 88/08* (2009.01)

(52) U.S. Cl.
USPC .......................................... 455/431; 455/561

(58) Field of Classification Search
USPC ................................. 455/431, 561
See application file for complete search history.

(56) References Cited

U.S. PATENT DOCUMENTS

| | | | |
|---|---|---|---|
| 5,519,761 A | 5/1996 | Gilhousen | |
| 5,559,865 A | 9/1996 | Gilhousen | |
| 5,832,380 A | 11/1998 | Ray et al. | |
| 6,018,659 A | 1/2000 | Ayyagari et al. | |
| 6,061,562 A | 5/2000 | Martin et al. | |
| 6,104,914 A | 8/2000 | Wright et al. | |
| 6,285,878 B1 * | 9/2001 | Lai | 455/431 |
| 6,788,935 B1 * | 9/2004 | McKenna et al. | 455/431 |
| 2002/0049055 A1 | 4/2002 | Matthews et al. | |
| 2004/0108963 A1 * | 6/2004 | Clymer et al. | 343/837 |

FOREIGN PATENT DOCUMENTS

WO    WO 97/41450    11/1997

* cited by examiner

*Primary Examiner* — Rasha Al Aubaidi
(74) *Attorney, Agent, or Firm* — Marshall, Gerstein & Borun LLP

(57) ABSTRACT

A system and method for providing wireless high-speed data services for an aircraft. Wireless data signals can be received and transmitted by one or more directional antennae on the aircraft which can be dynamically directed to track one or more terrestrial-based antennae. The terrestrial-based antennae, for receiving and transmitting wireless data signals, are directional and can also be dynamically directed in order to track the aircraft.

20 Claims, 2 Drawing Sheets

SYSTEM FOR TRANSMITTING WIRELESS HIGH-SPEED DATA SIGNALS BETWEEN A TERRESTRIAL-BASED ANTENNA AND AN AIRCRAFT

CROSS REFERENCE TO RELATED APPLICATIONS

This application is a continuation of U.S. patent application Ser. No. 10/378,203, filed on Mar. 3, 2003, which is hereby incorporated by reference in its entirety.

TECHNICAL FIELD OF THE INVENTION

The present invention relates generally to a system and method for providing wireless high-speed data service to aircraft, and, more specifically, to a new system and method for transmitting wireless high-speed data signals to an aircraft.

BACKGROUND OF THE INVENTION

In order to attract more customers and be more competitive, many commercial airline companies are seeking to expand the types of services and conveniences offered aboard their aircraft. One such convenience that many airlines already offers a wireless telephone service allowing passengers aboard the aircraft to make and receive telephone calls. With the increasing everyday use of the Internet for both business and personal purposes, some airline companies have recently begun providing high-speed data services, such as Internet access, aboard their flights.

One current method of providing high-speed data services such as broadband Internet access aboard an in-flight aircraft 100, as illustrated in FIG. 1, typically requires the use of a terrestrial or land-based system 110 in conjunction with a satellite 120 orbiting the planet. According to this method, wireless data signals representing the "upstream" data are transmitted from the aircraft 100 to a terrestrial-based system 110 that includes an antenna and transceiver. The "downstream" data is retrieved from sources such as the Internet by the terrestrial-based system 110, which then transmits the data to orbiting satellite 120. Satellite 120 then retransmits the data to aircraft 100, thereby completing the "loop."

A second method (not depicted) currently in use for providing high-speed data services onboard an aircraft 100 also includes the use of both a terrestrial-based system 110 and a satellite 120. However, unlike the previous method, the upstream signals are not transmitted directly from the aircraft 100 to the terrestrial-based system 110. Instead, the upstream signal transmitted by the aircraft 100 is first received by the satellite 120, which then re-transmits the signal to the terrestrial-based system 110. Accordingly, neither upstream nor downstream data signals travel directly between the terrestrial-based system 110 and the aircraft 100, but instead must be relayed through a satellite 120.

The asymmetric manner of the first method, which transmits data directly from the aircraft 100 to the terrestrial-based system 110, but requires data to return by way of orbiting satellite 120, results in several disadvantages. First, the system is quite complex and expensive due not only to the requirement of a satellite, but also the need for terrestrial-based transmitters and antennae that are powerful enough to communicate with the space-based satellite. Operating costs also remain quite high due to the significant amount of power needed to run a terrestrial-based transceiver and antenna capable of transmitting to a satellite. Lastly, reliability and ease of repair are issues due to the difficulty in physically accessing the satellite, which can result in long durations of down time of the overall system. The second method of transmitted data to the aircraft 100 suffers from the same disadvantages as it similarly requires the use of satellite 120. Accordingly, it also is expensive to setup and operate, not to mention difficult to maintain and repair.

Therefore, the inventors hereof have recognized the need for a new system and method for providing wireless high-speed data service to an in-flight aircraft.

SUMMARY OF THE INVENTION

The present invention relates to a new system and method for providing wireless high-speed data service to an aircraft. In particular, the new system and method includes one or more directional antennae on said aircraft that can be dynamically directed, along with one or more terrestrial-based directional antennae that can be dynamically directed.

DETAILED DESCRIPTION OF AN EMBODIMENT OF THE INVENTION

Figure 1:
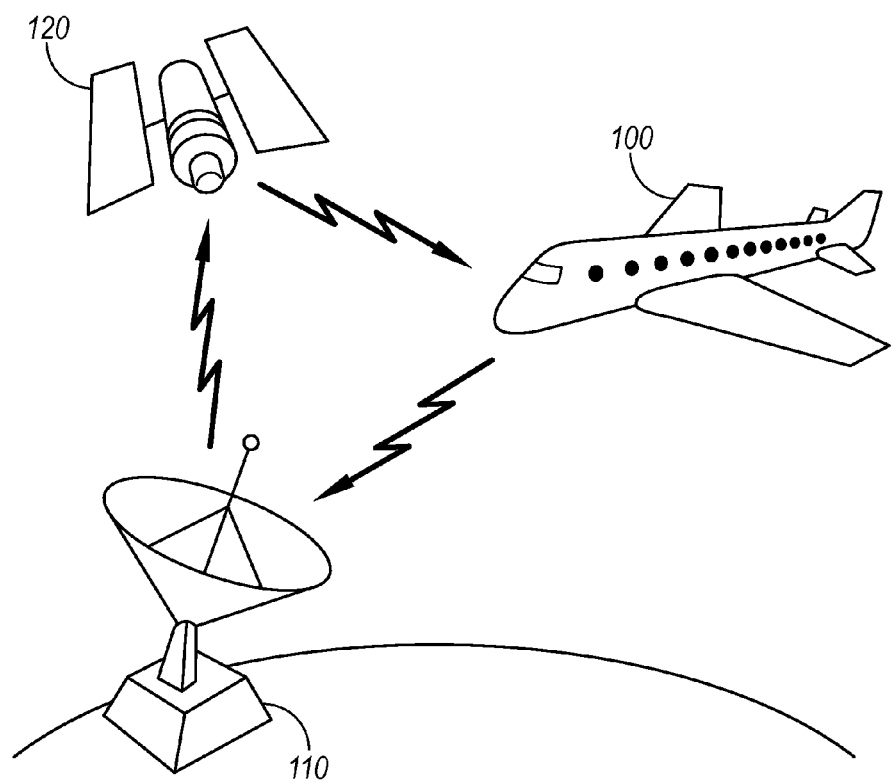
FIG. 1 is a simplified illustration of a typical system for providing wireless high-speed data services onboard an in-flight aircraft.
Figure 2:
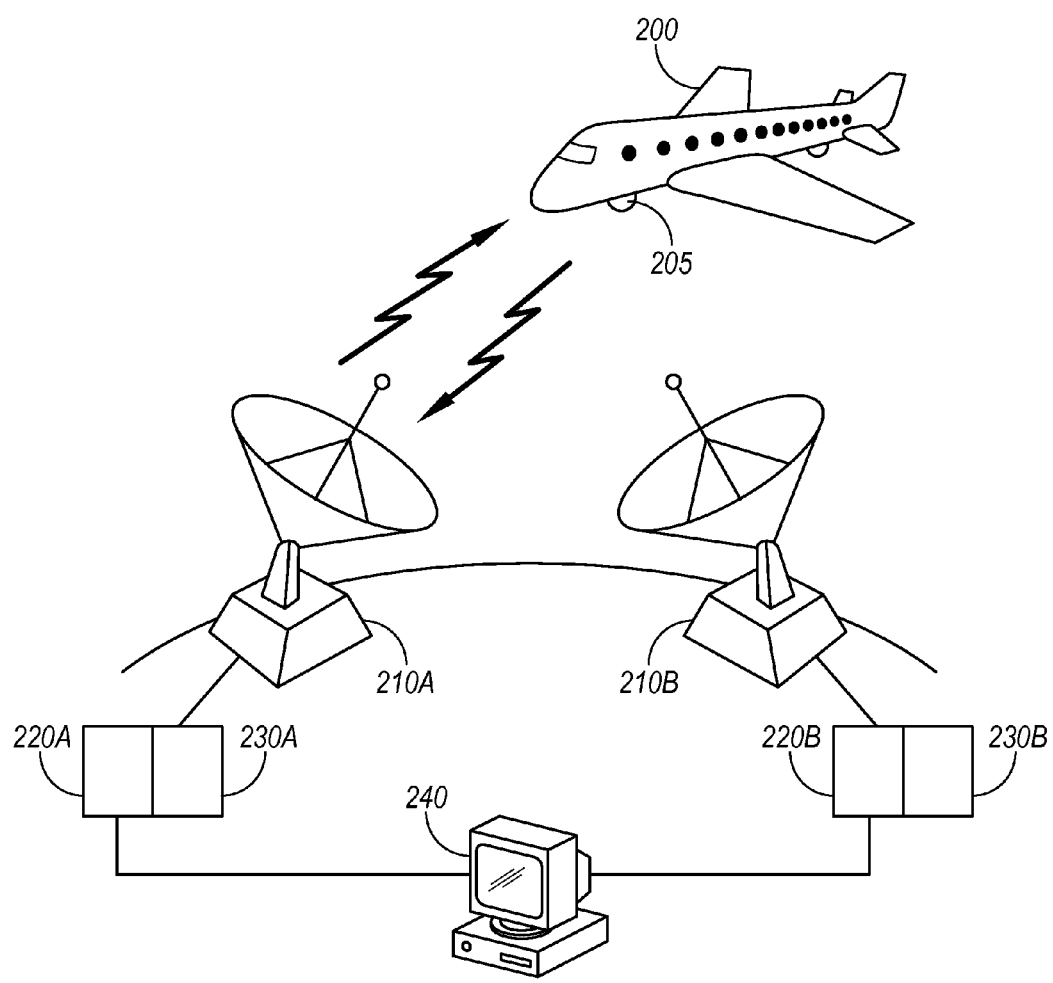
FIG. 2 is a simplified illustration of a system for providing wireless high-speed data services onboard an in-flight aircraft according to one embodiment of the present invention.

FIG. 2 illustrates one embodiment of a system for providing wireless high-speed data services, such as Internet access, in accordance with the present invention. Though described herein in connection with an aircraft, such as a commercial jet, the invention may be readily implemented or adapted to other vehicles that require line-of-sight wireless high-speed data services.

Depicted in FIG. 2 is an aircraft 200 having one or more antennae 205. In the current illustration, antennae 205 are shown mounted on the underside of the body of aircraft 200. However, the antennae 205 are not limited to this location but may be located anywhere on or within the aircraft 200 as long as the wireless data signals can travel to and from the antennae 205 relatively unimpeded.

Antennae 205 are preferably directional, and thus operate more effectively in a particular direction. Additionally, antennae 205 are preferably selectively directable. As such, either one individual antenna, a group of antennae, or all the antennae 205 on or within the aircraft 200 may be adjusted so that their most effective direction of operation relative to the antenna may be positioned in any direction relative to the course of the aircraft 200.

Two examples, provided for illustrative purposes, of types of antennae 205 that may be used with the present embodiment of the invention will now be discussed. One such type of antenna that may be effectively utilized includes a simple directional antenna such as a dish antenna. The dish antenna may be mechanically rotated or maneuvered by means of a small motor or the like so that the most effective direction of the antenna may be set to correspond to a particular direction relative to the course of the aircraft 200. Alternatively, instead of a mechanically directable dish antenna or the like, antennae 205 may be comprised of one or more electrically directable dynamic multi-element array antennae. By controlling the phase and/or amplitude of the individual signals radiated or received by each element of the array, for example, the direction of reception or radiation of the array can be controlled. In this manner, the beam projected by the antenna can be dynamically directed.

Other components associated with antennae 205 (but not shown in FIG. 2) include a transceiver and a controller for the aircraft antennae 205. The transceiver (transmitter-receiver) generates the signals actually transmitted by antennae 205 and processes the signals received by antennae 205. The antenna controller selectively controls one or more of the antennae 205 in order to dynamically adjust the direction in which they most effectively transmit and receive the wireless broadband signals.

On the ground are located a plurality of terrestrial-based antennae 210A, 210B, etc. Similar to the aircraft antennae 205, terrestrial-based antennae 210 are preferably directional, and thus operate more effectively in one general direction than another, such as a dish antenna which transmits a strong signal in the direction the dish is pointed, but transmits little to no signal in any other direction. If terrestrial-based antennae 210 are of a dish antenna type, it may be mechanically rotated or maneuvered by means of a small motor or the like. Alternatively, antenna 210 may be an electrically directable antenna array. Associated with each terrestrial antenna 210 is a transceiver 220 along with a controller 230. Both transceiver 220 and controller 230 connect to and communicate with their associated terrestrial-based antenna 210, as well as with each other. As in the case of the aircraft transceiver, the terrestrial-based transceiver 220 generates the signals that are transmitted, and processes the signals that are received, by associated antenna 210. Terrestrial-based controller 230 allows antenna 210 to be dynamically adjusted so that the effective orientation of the antenna 210 can be changed. This provides each of said terrestrial-based antennae 210 with the ability to track aircraft 200 while it is airborne.

Each terrestrial-based antenna 210, along with its associated transceiver 220 and controller 230, connects to a system controller 240. The system controller 240 monitors all of the terrestrial-based antennae 210, and their associated equipment, within a predetermined region. It is the job of system controller 240 to assess how effectively all the terrestrial-based antennae 210 are allocating bandwidth amongst all the aircraft 200 within the region, and if necessary, adjust or optimize bandwidth allocation amongst all the terrestrial-based antenna 210 or ground stations.

Now the operation of the wireless broadband system in accordance with a first embodiment of the invention will be discussed. A plurality of terrestrial-based antennae 210, along with their associated transceivers 220 and controllers 230, are dispersed throughout a region so as to preferably provide uniform coverage of the area. As an aircraft 200 flies through the region, one or more passengers aboard the aircraft 200 desire accesses to high-speed data services for activities such as, but not limited to, browsing the Internet, participating in a video teleconference, or watching streaming video or listening to streaming audio. An upstream data signal is generated by the aircraft transceiver (not shown) which subsequently transmits the signal through one or more of antennae 205 on the aircraft 200 to one or more of terrestrial-based antennae 210. The wireless data signal originating from aircraft 200 is subsequently received by a selected terrestrial-based antenna 210, whereupon the data signal is processed by its associated transceiver 220 and relayed out to one or more systems that provide the desired service. The sought after information returns from the providing system, is processed by transceiver 220, and then transmitted out from the terrestrial-based antenna 210 back to the aircraft 200. One or more of aircraft antennae 205 receive the downstream data signal and direct it to the aircraft transceiver which processes the data and sends it out along the aircraft's network back to the passenger.

To assure continuous high-speed data service on aircraft 200, the job of receiving and processing the data signals that originate from aircraft 200 is seamlessly passed from one terrestrial-based antenna 210B, and its associated transceiver 220B, to another terrestrial-based antenna 210A, and its associated transceiver 220A, as the aircraft flies through the region covered by these two antennae 210A and 210B. Specifically, terrestrial-based antenna 210B tracks the movement of aircraft 200 as it flies through the region serviced by that antenna. Each region serviced by a terrestrial-based antenna 210 overlaps the neighboring region serviced by the next terrestrial-based antenna 210. As such, when aircraft 200 begins to fly out of the region serviced by antenna 210B, it begins to enter the region serviced by antenna 210A, which starts to track the aircraft 200. Sometime during the transition from one region to another, antenna 210A, and its associated transceiver 220A, takes over the job of processing the data signals that it receives. This "handoff" from a first terrestrial-based antenna and transceiver to a second terrestrial-based antenna and transceiver is overseen by system controller 240, which coordinates the operation of antennae 210 and transceivers 220.

Similar to the above, aircraft antennae 205 selectively and dynamically track at least one of the terrestrial-based antennae 210 as the aircraft flies through the region serviced by that antenna 210. This helps assure the strongest transmission and reception of data signals between the aircraft 200 and the ground.

The tracking process performed by both aircraft antennae 205 and terrestrial-based antennae 210 is accomplished by each antenna's respective controller. The aircraft antenna controller (not shown) and terrestrial-based antenna controller 230 adjust their respective antennae based on predefined algorithms. For example, two such algorithms, provided for illustrative purposes, may involve the measured strength of a received signal, or the location of the aircraft 200 in relation to the location of a terrestrial-based antenna 210. According to the first algorithm, the antennae 205 and 210 are dynamically adjusted to maximize the measured strength of a received signal. According to the second algorithm, the aircraft antenna controller (not shown) and terrestrial-based antenna controller 230 calculate where their respective antennae should be directed based on the locations of the aircraft 200 and terrestrial-based antenna 210. Although the terrestrial-based antennae 210 are fixed in location, aircraft 200 is not and will have a continuously varying location while it is in-flight. Accordingly, a global positioning satellite (GPS) device, which is routinely part of the aircraft's 200 standard electronics, can be utilized to ascertain the location of the aircraft 200. Alternatively, a GPS device may be incorporated into the system of the present embodiment. The GPS device determines, in real time, the location of the aircraft 200. This location information is forwarded to the onboard aircraft antennae controller (not shown) as well as to the terrestrial-based antenna controller 230 by means of either the wireless high-speed data system, a wireless communication system that is separate from the wireless high-speed data system, such as, for example, the aircraft's mobile telephone system, or a combination of the two. Alternatively, based on this location information, both the terrestrial-based antenna controller and aircraft antennae controller can determine where the aircraft 200 is in relation to the terrestrial-based antennae 210 and adjust their respective antennae accordingly to accurately track the movement of the aircraft 200 or perceived movement of the terrestrial-based antenna 210.

According to one embodiment, the wireless high-speed data signals can be transmitted between said aircraft 200 and terrestrial-based antennae 210 on currently licensed frequencies reserved for air-to-ground telephony. In another embodiment, the wireless data signals can be transmitted on unlicensed frequencies, such as those in the 2.4 Ghz and 5.8 Ghz regions. Alternatively, one or more newly available frequencies may be used. Lastly, it may be possible to produce a viable system that transmits at frequencies utilized for next generation mobile communications.

In a further embodiment of the present invention, the amount of communication bandwidth allocated to one or more aircraft 200 can be dynamically adjusted. This is initiated by system controller 240, which monitors all the activity of the system within a defined region. System controller 240 can then either allocate more bandwidth or reduce the amount of bandwidth available to one or more aircraft 200 depending on the circumstances. For example, if a greater than average number of aircraft 200 within the same region were seeking high-speed data service, the system controller 240 may decide to reduce the amount of bandwidth available to each aircraft 200 in order to assure that a certain amount of bandwidth remains equally available to everyone. Alternatively, one or more aircraft 200 may be utilizing all of their allocated bandwidth while other aircraft 200 in the area are utilizing little to none of their bandwidth. In this situation, the system controller 240 can adjust the distribution of bandwidth so that those aircraft 200 demonstrating greater demand are allocated more bandwidth while a reduced amount of bandwidth is allocated to those aircraft 200 demonstrating little demand. Protocols may also be established that specifically dictate how bandwidth is distributed based upon specific situations or conditions. For example, a specific amount of bandwidth may be guaranteed or granted to one aircraft 200, possibly at the expense of another aircraft 200, through business arrangements, such as a grade of service selection, where a specific amount of bandwidth may be purchased either directly or indirectly by being allocated to certain classes of tickets/seats.

An additional embodiment of the invention provides for a system of transmitting high-speed data signals between an aircraft 200 and one or more terrestrial-based antennae 210 where the bandwidth of the signals are allocated or restricted according to one or more parameters, including time span, location, signal frequency and signal coding. These restrictions are put into place by processing the data signals in accordance with various methods, including, for example, frequency division multiple access (FDMA), code division multiple access (CDMA), time division multiple access (TDMA) and space division multiple access (SDMA). Accordingly, two different aircraft may be allocated certain bandwidths based simply on the locations of the aircraft. This may be carried out through the use of space division multiple access (SDMA) signals. For two or more aircraft in the same general location, bandwidth allocation may instead be accomplished by assigning a different frequency to each aircraft, such as through a frequency division multiple access (FDMA) process. Similarly, bandwidth may be allocated among multiple aircraft that are utilizing the same frequency by assigning each aircraft a unique code through a process of using code division multiple access (CDMA) signals. For even greater control over bandwidth allocation, signals that may be using the same code may be further distributed based on specific spans of time (TDMA).

In at least one embodiment of the present invention, the various methods of allocating bandwidth, as discussed above, may be applied one or more at a time, and dynamically adjusted. As such, an aircraft within a first region may be receiving data signals where bandwidth is allocated according to a FDMA technique, while a neighboring region is utilizing a CDMA technique to allocate bandwidth. Thus, as an aircraft flies out of a first region and into a second region, it may be required to dynamically adjust to the method used in the present region for allocating bandwidth.

By utilizing only terrestrial-based antennae 210 to transmit high-speed data signals to and receive data signals from an aircraft 200, services such as high-speed Internet access, video teleconferencing, and streaming video and audio can be provided upon an in-flight aircraft 200 at less cost initially, and in the long run. These reduced costs are obtained by avoiding the use of complicated and expensive satellites, which in turn normally require the use of high-power transceivers and antennae. Furthermore, by relying only on equipment that can be readily accessed from the ground, maintenance and repairs can be performed more quickly and at less cost, resulting in a more reliable system.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system, comprising:
   a plurality of terrestrial-based antennae configured to receive data signals from and transmit data signals to aircraft distributed amongst a plurality of predetermined regions, wherein the plurality of predetermined regions each have an associated bandwidth distribution protocol included in a plurality of bandwidth distribution protocols; and
   a controller in communication with the plurality of terrestrial-based antennae, the controller configured to monitor a location of aircraft within the plurality of predetermined regions and coordinate an operation of the plurality of the terrestrial-based antennae;
   wherein the controller is configured to adjust an amount of bandwidth supplied to an aircraft, the controller configured to adjust the amount of bandwidth based upon a first one of the plurality of bandwidth distribution protocols when the aircraft is in a first one of the predetermined regions, the controller configured to adjust the amount of bandwidth based upon a second one of the plurality of bandwidth distribution protocols when the aircraft is in a second one of the predetermined regions.

2. The system of claim 1, wherein each of the plurality of terrestrial-based antennae comprises a dish antenna.

3. The system of claim 1, wherein at least one of the predetermined regions is a terrestrial region.

4. The system of claim 1, wherein the controller is configured to adjust the amount of bandwidth based at least partially upon a number of aircraft communicating with a first one of the plurality of terrestrial-based antennae.

5. The system of claim 1, wherein the controller is configured to adjust the amount of bandwidth based at least partially upon a bandwidth demand of at least one aircraft.

6. The system of claim 1, wherein the plurality of bandwidth distribution protocols includes at least one of a code-division multiple access (CDMA) approach, a frequency division multiple access approach (FDMA), a space division multiple access approach (SDMA) and a time division multiple access approach (TDMA).

7. The system of claim 1, wherein the controller is configured to transfer control of communication with one of the aircraft from a first one of the plurality of terrestrial-based antennae to a second one of the plurality of terrestrial-based antennae without generating a perceived disruption in communication to the aircraft.

8. The system of claim 1, wherein the plurality of terrestrial-based antennae is directional antennae configured to selectively track the aircraft.

9. The system of claim 1, further comprising at least one antenna on one of the aircraft, the at least one antenna configured to transmit and receive data signals between the one of the aircraft and the plurality of terrestrial-based antennae.

10. A system, comprising:
a controller in communication with a plurality of terrestrial-based antennae, the plurality of terrestrial-based antennae configured to receive data signals from and transmit data signals to aircraft distributed amongst a plurality of predetermined regions, wherein the plurality of predetermined regions each have an associated bandwidth distribution protocol included in a plurality of bandwidth distribution protocols;
wherein the controller is configured to monitor a location of aircraft within the plurality of predetermined regions and coordinate an operation of the plurality of terrestrial-based antennae, wherein the controller is configured to adjust an amount of bandwidth supplied to an aircraft, the controller configured to adjust the amount of bandwidth based upon a first one of the plurality of bandwidth distribution protocols when the aircraft is in a first one of the predetermined regions, the controller configured to adjust the amount of bandwidth based upon a second one of the plurality of bandwidth distribution protocols when the aircraft is in a second one of the predetermined regions.

11. The system of claim 10, wherein at least one of the predetermined regions is a terrestrial region.

12. The system of claim 10, wherein the controller is configured to adjust the amount of bandwidth based at least partially upon a number of aircraft communicating with a first one of the plurality of terrestrial-based antennae.

13. The system of claim 10, wherein the controller is configured to adjust the amount of bandwidth based at least partially upon a bandwidth demand of at least one aircraft.

14. The system of claim 10, wherein the plurality of bandwidth distribution protocols includes at least one of a code-division multiple access (CDMA) approach, a frequency division multiple access approach (FDMA), a space division multiple access approach (SDMA) and a time division multiple access approach (TDMA).

15. The system of claim 10, wherein the controller is configured to transfer control of communication with one of the aircraft from a first one of the plurality of terrestrial-based antennae to a second one of the plurality of terrestrial-based antennae without generating a perceived disruption in communication to the aircraft.

16. A method, comprising:
transmitting a first data signal from a first one of a plurality of terrestrial-based antennae to an aircraft, the plurality of terrestrial-based antennae distributed amongst a plurality of predetermined regions, the first one of the plurality of terrestrial-based antennae located in a first one of the predetermined regions, the plurality of predetermined regions each having an associated bandwidth distribution protocol included in a plurality of bandwidth distribution protocols;
adjusting a bandwidth size of the first data signal, the bandwidth size adjusted based upon a first one of the plurality of bandwidth distribution protocols;
transmitting a second data signal from a second one of the plurality of terrestrial-based antennae to an aircraft, the second one of the plurality of terrestrial-based antennae located in a second one of the predetermined regions; and
adjusting a bandwidth size of the second data signal, the bandwidth size adjusted based upon a second one of the plurality of bandwidth distribution protocols different from said first one of the plurality of bandwidth distribution protocols.

17. The method of claim 16, further comprising establishing at least one of the predetermined regions as a terrestrial region.

18. The method of claim 16, wherein the bandwidth size of at least one of the first and second data signals is adjusted in response to a demand for increased bandwidth from the aircraft.

19. The method of claim 16, wherein the bandwidth size of the first data signal is adjusted based at least partially upon a number of aircraft communicating with the first one of the plurality of terrestrial-based antennae.

20. The method of claim 16, further comprising establishing the plurality of bandwidth distribution protocols as including at least one of a code-division multiple access (CDMA) approach, a frequency division multiple access approach (FDMA), a space division multiple access approach (SDMA) and a time division multiple access approach (TDMA).

* * * * *